United States Patent
Mon (10) Patent No.: US 11,476,651 B1
(45) Date of Patent: Oct. 18, 2022

(54) FINISH MATERIAL INTERFACE FLANGE

(71) Applicant: George Emmanuel Mon, Ladera Ranch, CA (US)

(72) Inventor: George Emmanuel Mon, Ladera Ranch, CA (US)

(*) Notice: Subject to any disclaimer, the term of this patent is extended or adjusted under 35 U.S.C. 154(b) by 0 days.

(21) Appl. No.: 17/861,779

(22) Filed: Jul. 11, 2022

Related U.S. Application Data (62) Division of application No. 17/723,176, filed on Apr. 18, 2022, now Pat. No. 11,424,604.

(51) Int. Cl.
  *H02G 3/12* (2006.01)
  *H02G 3/14* (2006.01)

(52) U.S. Cl.
  CPC ............... *H02G 3/12* (2013.01); *H02G 3/14* (2013.01)

(58) Field of Classification Search
  CPC .. H02G 3/12; H02G 3/14; H02G 3/08; H02G 3/081; H02G 3/088; H02G 3/10; H02G 3/123; H05K 5/00; H05K 5/02; H05K 5/0217; H05K 5/03
  USPC .. 174/66, 67, 50, 53, 57, 58, 480, 481, 502, 174/535; 220/3.2–3.9, 4.02, 241, 242; 248/906, 343
  See application file for complete search history.

(56) References Cited

U.S. PATENT DOCUMENTS

| | | | | | |
|---|---|---|---|---|---|
| 4,794,207 | A * | 12/1988 | Norberg | ............... | H02G 3/125 174/53 |
| 4,927,039 | A * | 5/1990 | McNab | ............... | H02G 3/125 220/3.7 |
| 7,378,591 | B2 * | 5/2008 | Dinh | ............... | H02G 3/086 220/3.6 |
| 8,058,570 | B2 * | 11/2011 | Solan | ............... | H02G 3/14 174/50 |
| 8,610,004 | B2 * | 12/2013 | Solan | ............... | H02G 3/123 174/58 |
| 8,933,331 | B1 * | 1/2015 | Gretz | ............... | H02G 3/121 174/53 |
| 11,258,243 | B1 * | 2/2022 | Gretz | ............... | H02G 3/126 |

* cited by examiner

*Primary Examiner* — Angel R Estrada (57) ABSTRACT

The Finish Material Interface Flange provides an interface between specific electrical boxes and adjacent building assembly finish materials. The Finish Material Interface Flange preferred embodiment cooperates with the Flush Wallplate Electrical Box of parent application 17/723,176 serving to frame an electrical wallplate such that the wallplate finished face is essentially co-planar to the surrounding wall assembly finish material finished surface, referred to as a flush wallplate installation. The Finish Material Interface Flange also serves to facilitate a consistent termination of wall assembly materials at the periphery of the electrical box while reducing labor required to do so. The form of the Interface Flange provides the desired flush wallplate installation with minimum variability.

2 Claims, 8 Drawing Sheets

FINISH MATERIAL INTERFACE FLANGE

CROSS REFERENCE TO RELATED PATENT APPLICATIONS

This application claims the benefit of U.S. Non-Provisional Utility patent application Ser. No. 17/723,176 filed Apr. 18, 2022 by George E. Mon as sole inventor, the contents of which are incorporated herein by reference in its entirety.

Application Ser. No. 17/723,176 was issued an election requirement; applicant elected material of species "A" as divided by examiner/USPTO. The current application is a divisional application claiming unelected material and claims from that election requirement directed as species "B".

No material other than that contained in the original application Ser. No. 17/723,176 is presented or claimed in this divisional application. The specification and drawings in the current application set forth the portion of the 17/723,176 disclosure germane to the invention claimed in the current divisional application. The reference numbers have been edited and renumbered to include only those germane to the current divisional application.

FIELD OF THE INVENTION

The present invention relates to the interface between electrical boxes used in new and old work type electrical installations and wall assembly finish materials.

BACKGROUND OF THE INVENTION

Devices such as receptacles and switches are installed at electrical enclosures/boxes placed in wall assemblies and are covered by wallplates to prevent building occupant exposure to electrical components and to provide an interface between the devices and the wall assemblies surrounding them. Typically, the wallplates are placed with their finish face co-planar with the outlet finish face and their non-face side co-planar and partially covering the adjacent wall surface such as wallboard.

Installations where the wallplate face and electrical outlet are placed co-planar to the adjacent wall surface—that is, a Flush Wallplate Electrical Box installation were presented by application Ser. No. 17/723,176. The installation of these boxes, however, require an interface between the electrical box and the adjacent finish materials.

Furthermore, new energy codes used throughout North America require decreased air flow through wall and ceiling assemblies including at these electrical boxes for compliance. As such, the interface between the electrical box and other components needs to be designed to minimize this airflow.

Lastly, the manner of interface between electrical boxes and finish materials should not disrupt or lengthen typical construction methods including those of wallboard installers and finishers.

Accordingly, a device which facilitates code compliant flush wallplate installation while minimizing labor required during finishing around the electrical box and simultaneously provides decreased air flow at the wall assembly is desired.

SUMMARY OF THE INVENTION

The Finish Material Interface Flange, hereafter principally referred to as the Interface Flange, provides an interface between an electrical box and wall assembly finish materials and particularly regards the interface between the Flush Wallplate Electrical Box presented in application Ser. No. 17/723,176 and wallboard type materials in some installations. Additionally, the Interface Flange allows for increased wall assembly air sealing at electrical boxes.

Neither the wallplate, subplate or any outlet shown in figures is a part of this application. Rather the preferred embodiment Interface Flange works with the previously presented Flush Wallplate Electrical Box, hereafter principally referred to as the FWE Box, and standard electrical components from most any electrical device manufacturer to facilitate a code compliant installation of same in typical construction assemblies.

The Interface Flange is formed in proportions that would permit nested placement inside a portion of the FWE Box. Additionally, the Interface Flange is formed of proportions that may complement the dimensions of the wallplates and subplates of a particular manufacturer for a more precise fit. The flange may be manufactured of a material to provide a surface of similar materials and thus appearance to that of the wallplate in the area between the electrical box and wall assembly as well.

The interface flange reduces labor required for wall assembly construction around the FWE Box particularly where the wall assembly finish material is gypsum wallboard. Once placed, the preferred embodiment of the Interface Flange provides a ready substrate for application of joint compound for finishing the wallboard in the vicinity of the electrical box.

The Interface Flange additionally may serve as a substrate for placement of foam sealing tapes or gaskets which together with the FWE Box provide for air and vapor sealing of the wall assembly. This Flange sealing method also eliminates the use of messy and laborious putties or spray foam in the wallboard cutout area.

The structures, proportions and configurations presented can be implemented in single, double, multi "gang" and round enclosure (sometimes referred to as a round box) embodiments.

While the Flush Wallplate Electrical Box of application Ser. No. 17/723,176 is not the subject of this divisional application, it is none-the-less shown in the drawings and referenced in the Detailed Description in order to provide context for the structure and purpose of the Finish Material Interface Flange of the current application.

DETAILED DESCRIPTION OF THE PREFERRED EMBODIMENTS

Figure 1:
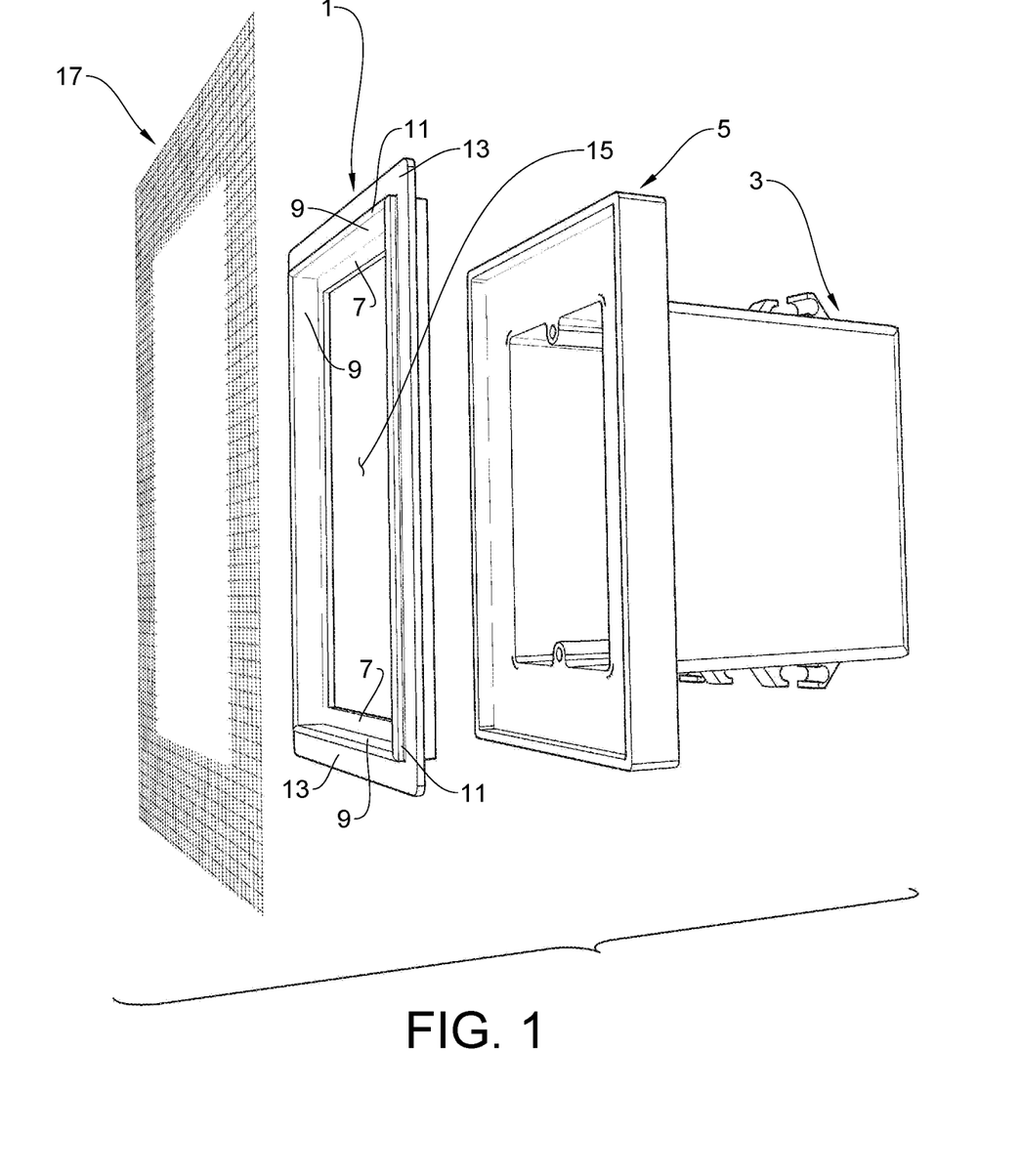
FIG. 1 is an exploded perspective view of the flush wallplate electrical box and finish material interface flange.
Figure 2:
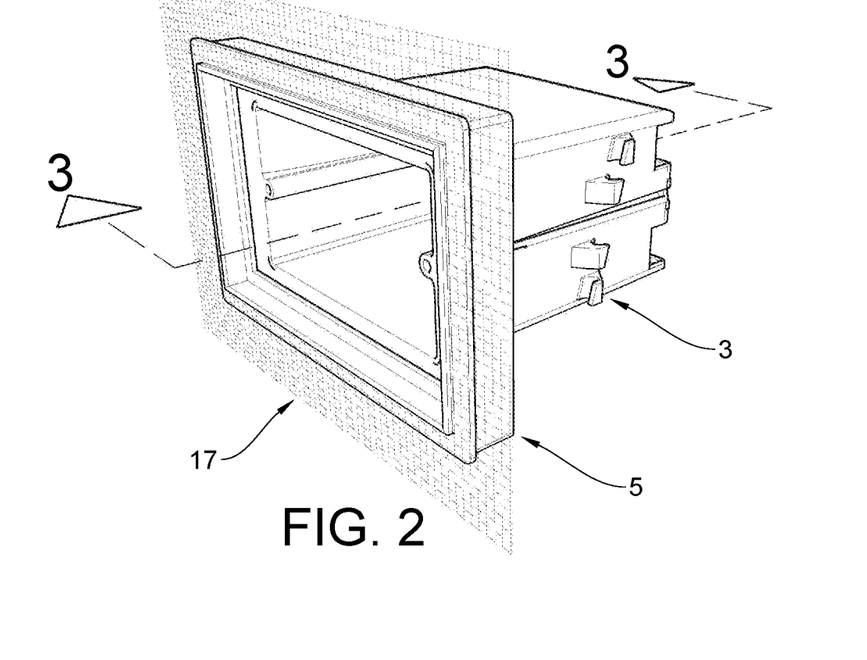
FIG. 2 is a perspective view of the flush wallplate electrical box and finish material interface flange defining section 3.
Figure 3:
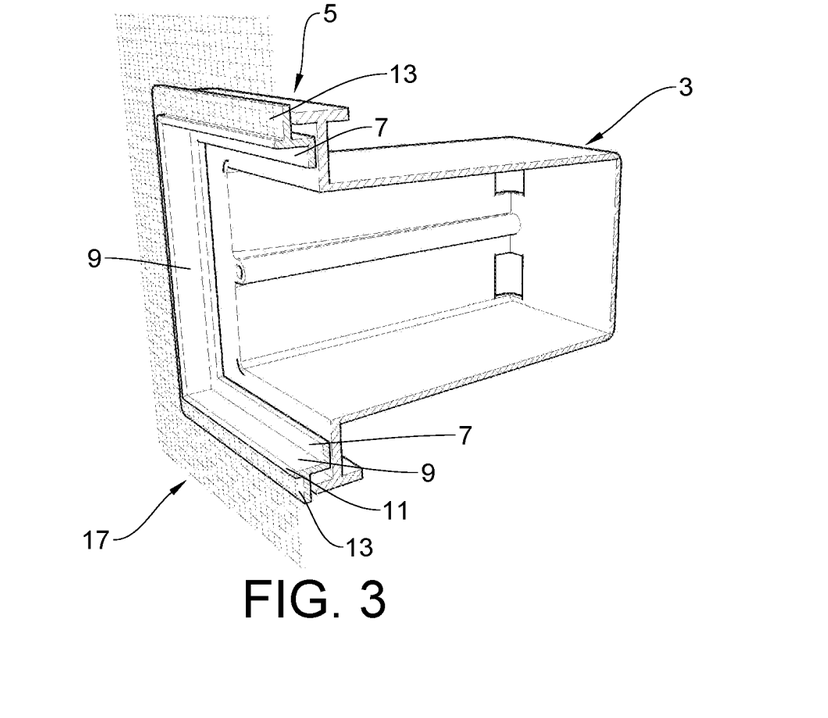
FIG. 3 is a perspective section of the flush wallplate electrical box and finish material interface flange.

Referring to FIGS. 1-3: The Finish Material Interface Flange (1), hereafter principally referred to as the Interface Flange, is shown paired with the Flush Wallplate Electrical Box (3). The Interface Flange is formed in longitudinal and transverse dimensions that would permit nested placement inside of the FWE Box wallplate housing (5) and also provide a uniform distance between the electrical wallplate peripheral edge and wall assembly finish materials. The Interface Flange is comprised of four Interface Flange portions: a reveal back portion (7) parallel to the FWE Box housing, a reveal side portion (9), a projection portion (11), a finish material abutment portion (13). It additionally includes an Interface Flange open face (15), sized to permit nested placement of the electrical components.

The Interface Flange portions have the following attributes. First, the reveal back (7) and reveal side portions (9) provide a controlled distance and a finish material between the electrical wallplate and the wall finish material adjacent to the box. The proportions of the reveal back and reveal side portions are selected for specific electrical components from specific manufacturers for best achieving this controlled distance. Second, the finish material abutment portion (13) provides a substrate for placement of wallboard joint compound fiberglass or nylon meshes (17) in the instance that the finish material is wallboard. Paper wallboard finishing tapes may be used in lieu of these meshes. These meshes (17) or tapes serve to strengthen the bond between the wallboard and the Interface Flange. The meshes or tapes can be adhesively bonded to the abutment portion (13) at manufacture, as is presented and shown in FIGS. 2-9, or can be optionally omitted and their placement left to the wallboard finisher. The peripheral edge of the inside face of the mesh or tape would be placed against the wallboard and joined to the wallboard using typical wallboard joining methods. Third, the flange projection (11) portion provides a projection which serves, again for wallboard installations, as a screed guide for wallboard joint compound to be applied to a consistent depth using wallboard finishing tools. The Interface Flange is thus connected to the wallboard by joint compound finishing. Optionally, the Interface Flange can be adhered to the wallboard prior to finishing using specialized spray adhesives intended for adhering wallboard finish trims to wallboard in order to facilitate steady joint compound finishing.

After wallboard finishing, the Interface Flange is now mechanically connected to the wallboard. It should be noted that while the Interface Flange (1) is nested within the FWE Box wallplate housing (5), it is not adhesively or mechanically connected to either the FWE Box, flush wallplate or outlet. This is by intent so as to isolate the wall assembly from the electrical box and wallplate and thus help prevent cracking of the wall assembly finish materials due to outlet use or thermal expansion and contraction.

In the instance that the wall finish material is other than wallboard and the interface flange is used, the projection portion (11) portion serves as a stop for materials that abut the flange.

Figure 4:
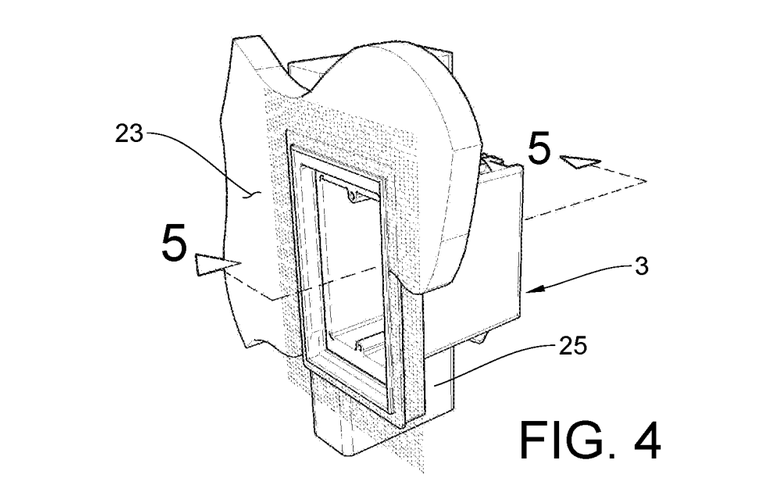
FIG. 4 is a perspective view of the flush wallplate electrical box and finish material interface flange placed in a wall assembly cut-away and defining section 5.
Figure 5:
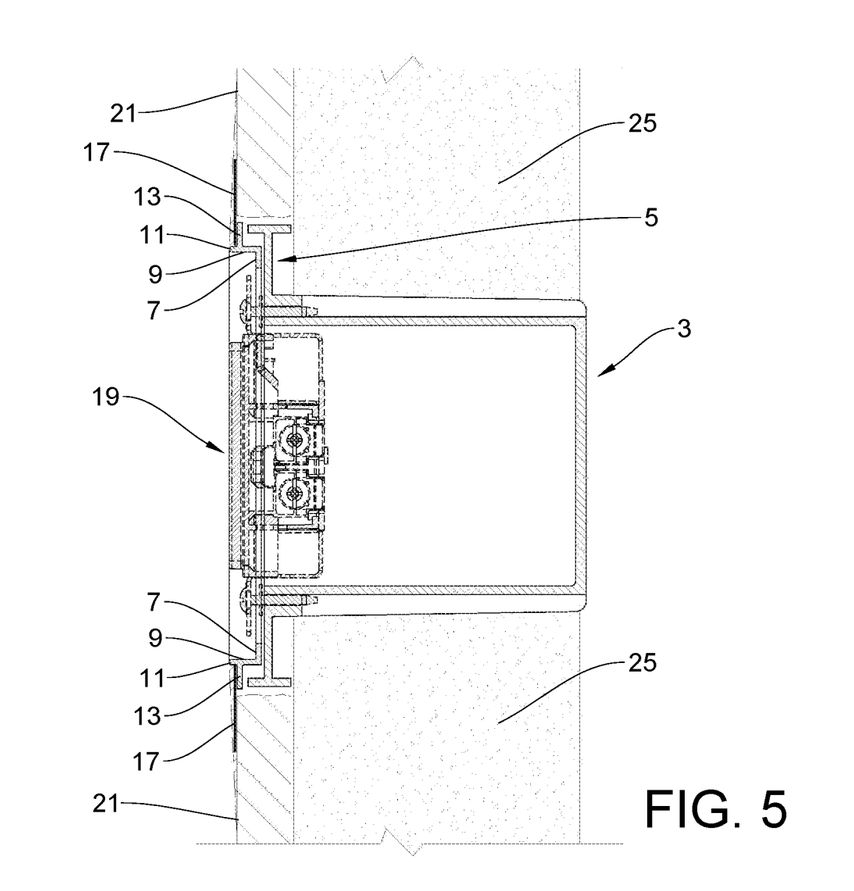
FIG. 5 is an orthographic section of the flush wallplate electrical box and finish material interface flange with a typical electrical receptacle placed.

Referring to FIGS. 4 and 5: The Interface Flange is shown placed in a nested manner into the FWE Box wallplate housing (5) in a typical wall assembly of wood framing members and wallboard. An electrical receptacle (19, in dashed lines), while not a part of this application, is shown to describe its position in this flush wallplate installation. The Interface Flange mesh (17) is shown placed against the outside face (21) of the wallboard (23) which itself is attached to wood framing (25).

Figure 6:
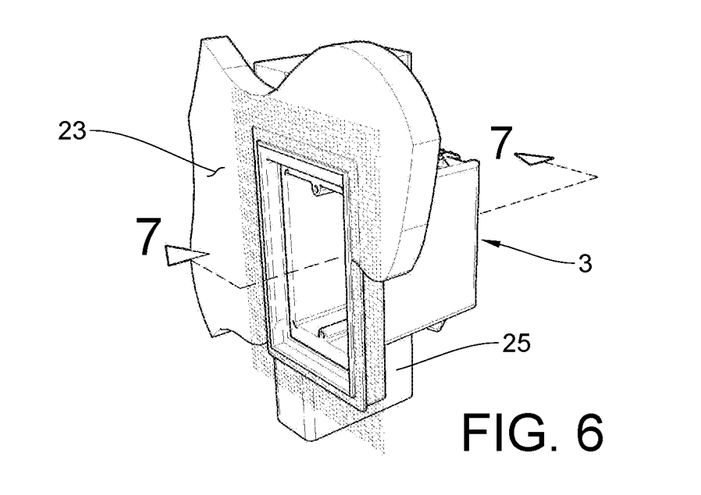
FIG. 6 is a perspective view of the flush wallplate electrical box and finish material interface flange placed in a wall assembly cut-away and defining section 7.
Figure 7:
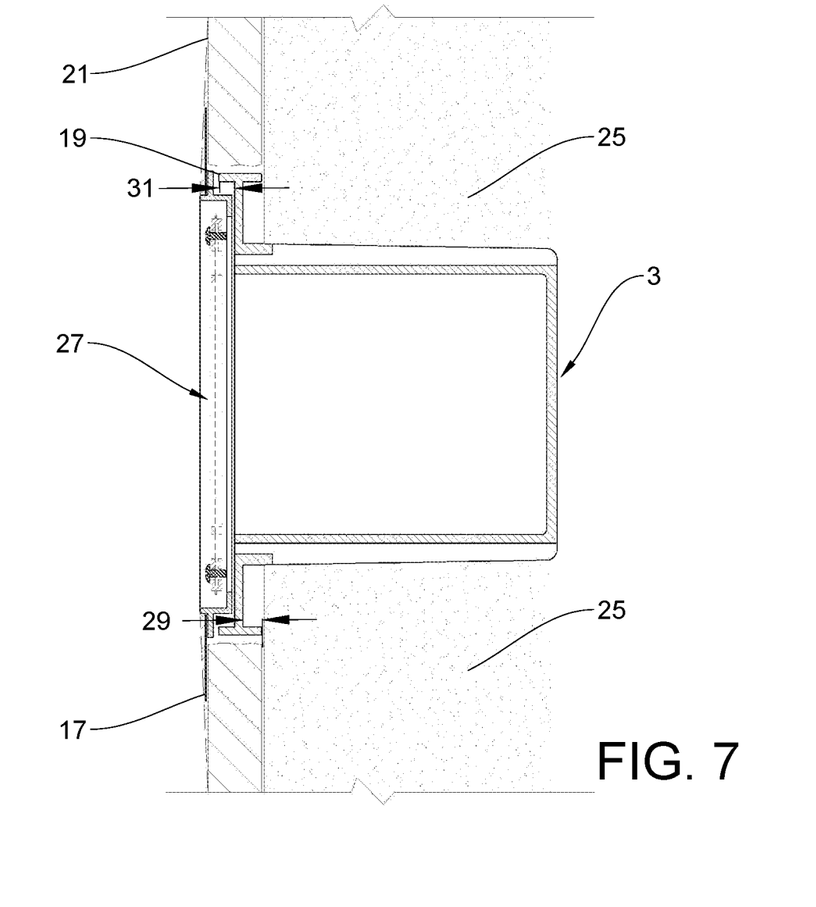
FIG. 7 is an orthographic section of the flush wallplate electrical box and finish material interface flange with typical screwless wallplate subplate placed.

Referring to FIGS. 6 and 7: The Interface Flange is again shown placed in a nested manner into the FWE Box wallplate housing in a typical wall assembly of wood framing members and wallboard. As presented in application Ser. No. 17/723,176, a FWE wallplate housing portion dimension (29) is sized according to the depth required for the wallboard used and another FWE Box housing portion dimension (31) is sized to permit nested placement of the Interface Flange in a code compliant manner. In FIG. 7, a standard flush wallplate subplate (27, in dashed lines), while not part of this application, is shown to describe its position relative to the Interface Flange in this flush wallplate installation.

Figure 8:
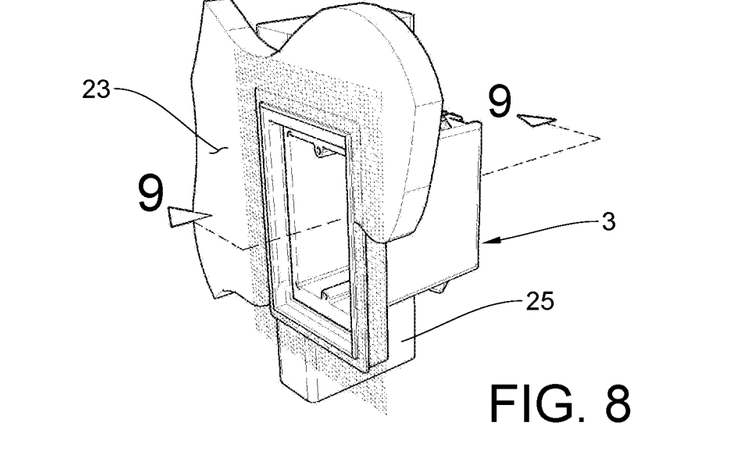
FIG. 8 is a perspective view of the flush wallplate electrical box and finish material interface flange placed in a wall assembly cut-away and defining section 9.
Figure 9:
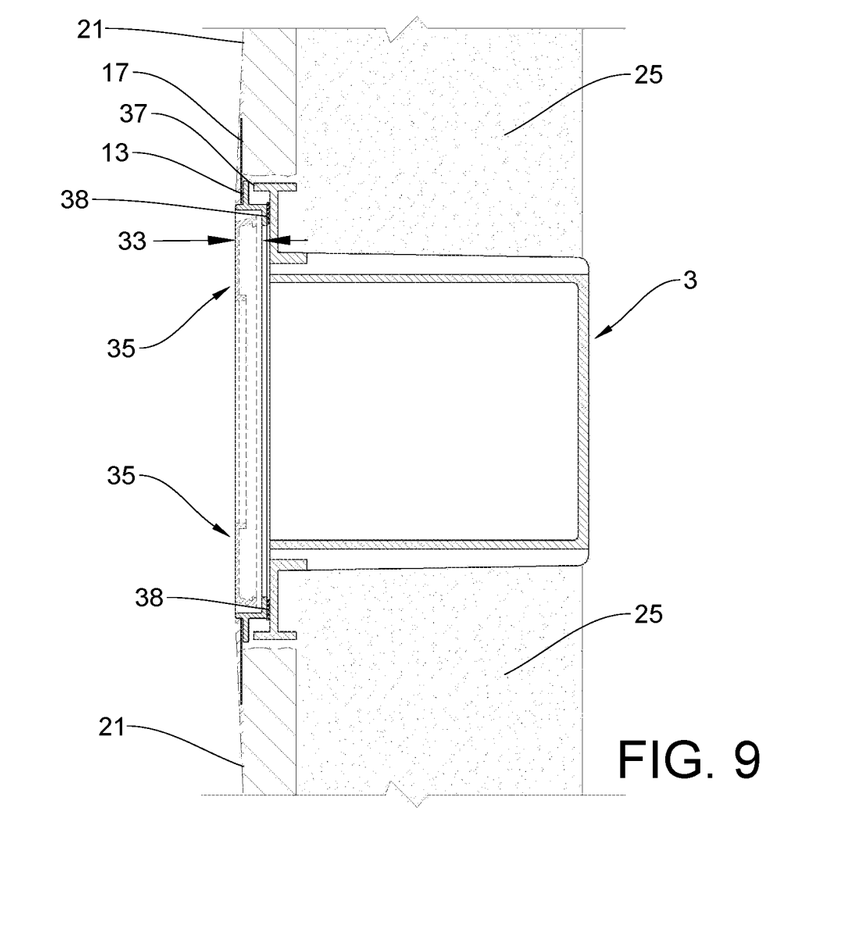
FIG. 9 is an orthographic section of the flush wallplate electrical box and finish material interface flange with typical screwless wallplate placed.

Referring to FIGS. 8 and 9: The Interface Flange reveal side portion and Interface Flange projection portion dimensions are specified such that together those dimensions (33) assure that the flush wallplate (35) generally aligns with the outside face (21) of wallboard (23) after wallboard finishing. In FIG. 9, the flush wallplate (35, in dashed lines), not part of this application, is shown in its installed position—with its finish face substantially co-planar with the wallboard finish face (21) as is desired. While the flush wallplate (35), subplate (27) and receptacle (19) are shown in separate figures (FIGS. 9, 7, and 5 respectively) for visual clarity, their position in the figures is generally accurate relative to the Interface Flange, the FWE Box and each other. Also shown here is the interface flange finish material abutment portion (13) front surface is recessed slightly from the face of wall assembly finish material (21) to allow for placement of mesh or wallboard tape and wallboard joint compound. This is enabled by a FWE Box housing portion front edge (37) being set back from the finish material face (21) within tolerances allowed by code as presented in application Ser. No. 17/723,176. The Interface Flange mesh plus joint compound projection from the plane of the wall assembly is thus minimized producing a flatter wall surface in proximity to the FWE Box.

Because the measurement between the Interface Flange reveal side portion (9) and flush wallplate (35) outside edge, typically referred to as the reveal, is critical, a finish material interface flange placement guide presented in the original application Ser. No. 17/723,176 may be used.

Referring to FIG. 9: The Interface Flange is shown to depict the Interface Flange serving as a substrate for placement of foam sealing tapes or gaskets (38), again not a part of this application, which together with the FWE box housing provide for tight air sealing. This flange sealing method also eliminates the use of messy and laborious putties or spray foam in the wallboard cutout area. Note the gasket is shown compressed and is shown and referenced only in FIG. 9 for figure clarity.

Figure 10:
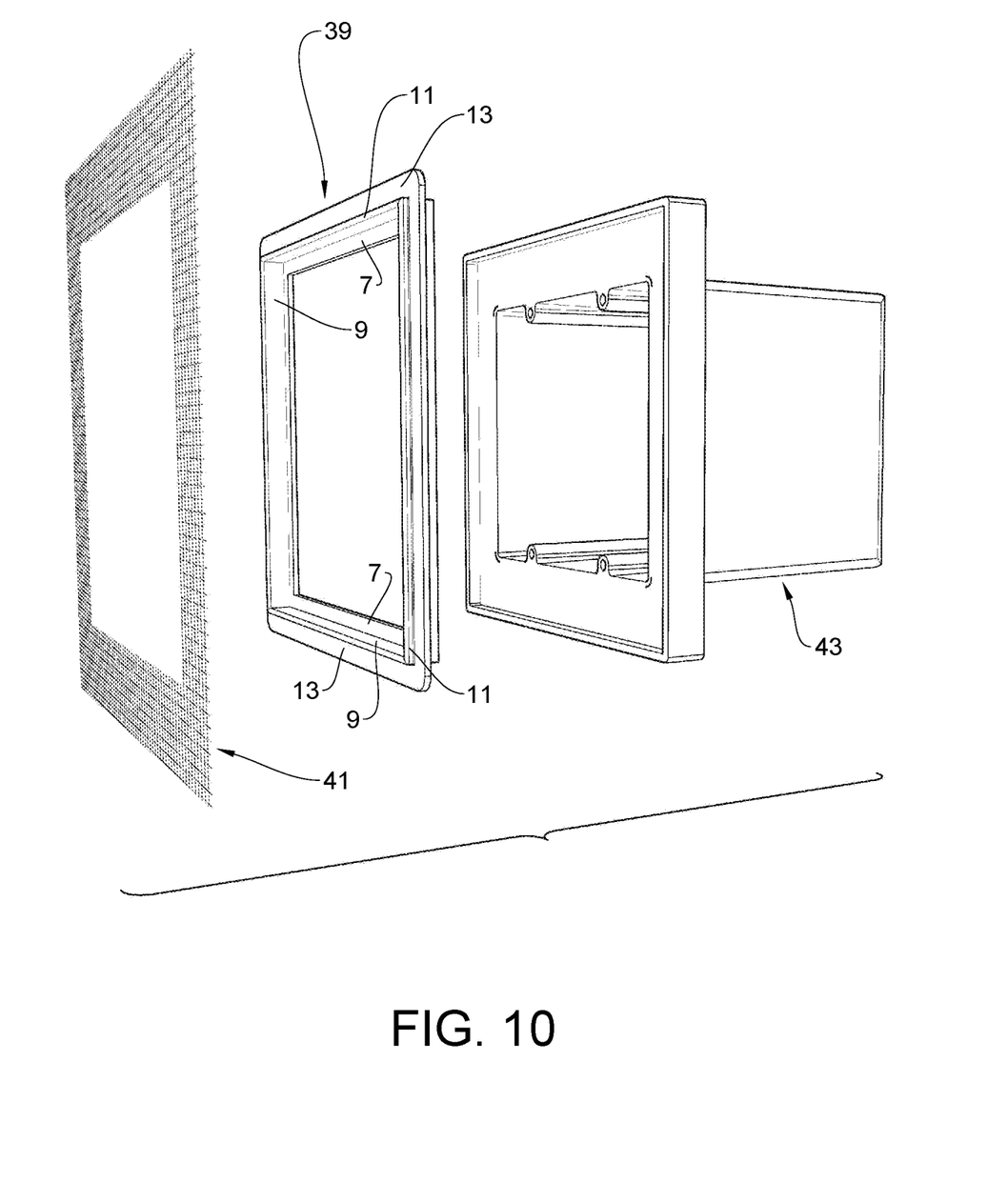
FIG. 10 is an exploded perspective view of the flush wallplate electrical box and finish material interface flange two "gang" box embodiment.

Referring to FIG. 10: A two "gang" embodiment of the Finish Material Interface Flange (39) with wallboard finishing mesh (41) and 2 "gang" FWE Box (43) are shown as representative of the adopting the structures, proportions and configurations to two and multi-"gang" embodiments. Note the reveal back portion (7), reveal side portion (9), projection portion (11) and finish material abutment portion (13) structures and proportions remain as those of the single outlet installation.

Figure 11:
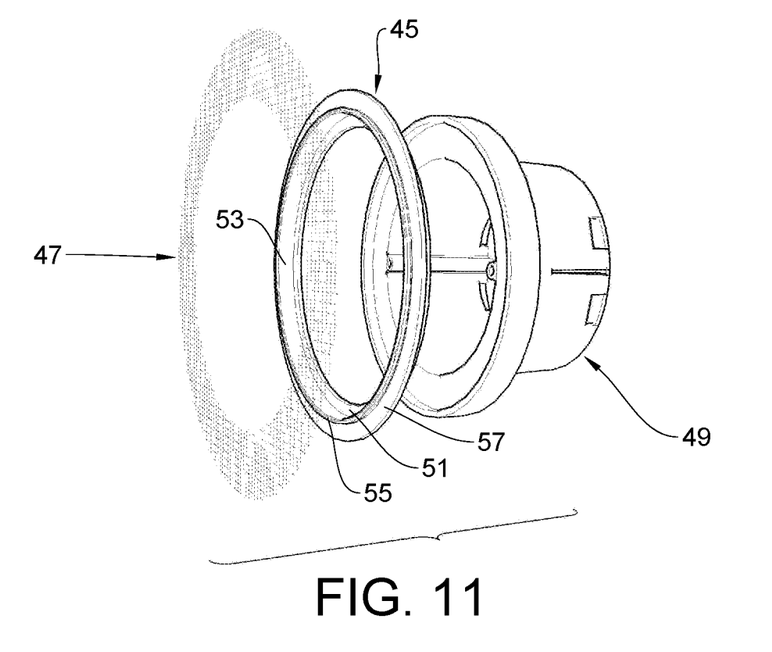
FIG. 11 is an exploded perspective view of the flush wallplate electrical enclosure/box round embodiment and round finish material interface flange.
Figure 12:
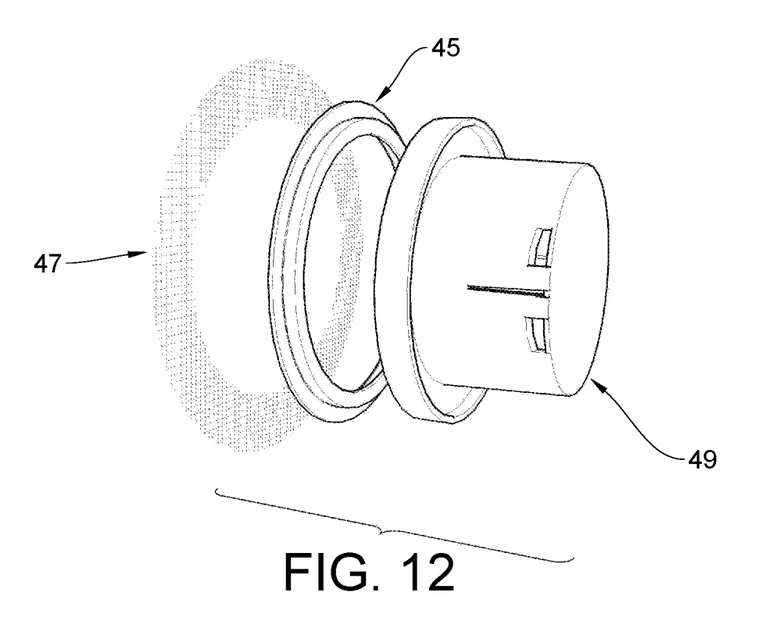
FIG. 12 is an alternative exploded perspective view of the round flush wallplate electrical enclosure (round box) embodiment and round finish material interface flange.

Referring to FIGS. 11 and 12: A round embodiment (45) of the Finish Material Interface Flange with a round wallboard finishing mesh (47) and round FWE enclosure (49) are shown as representative of the adopting the structures, proportions and configurations to round electrical enclosure embodiments. Also referenced are the round embodiment of the Finish Material Interface Flange reveal back portion (51), reveal side portion (53), projection portion (55), and finish material abutment portion (57). They are given new reference numbers to distinguish from the rectangular embodiments.

Figure 13:
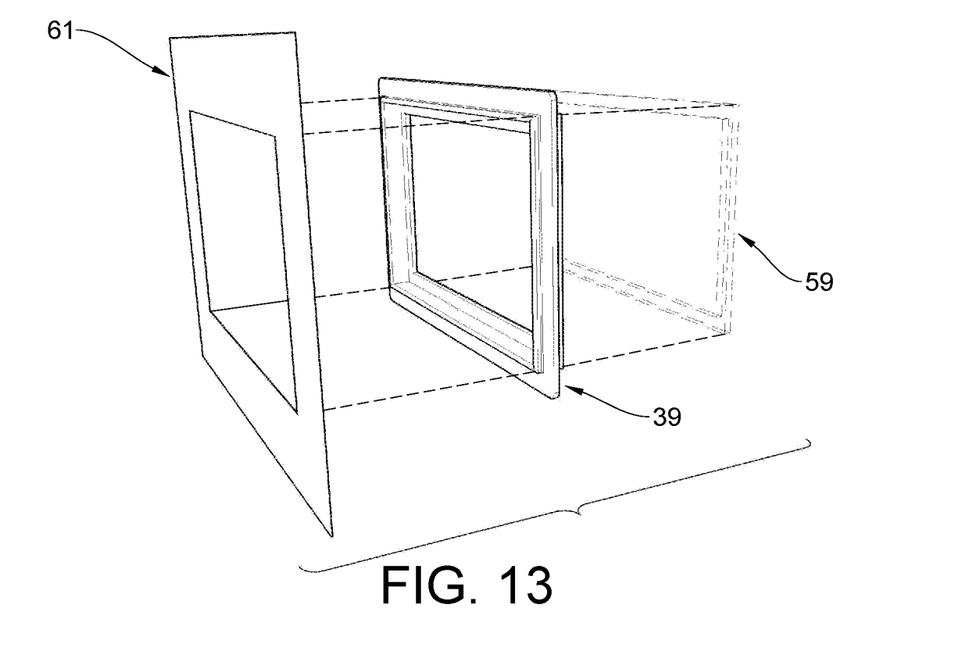
FIG. 13 is an exploded perspective view of the finish material interface flange with paper tape in lieu of mesh and receiving an air sealing gasket.
Figure 14:
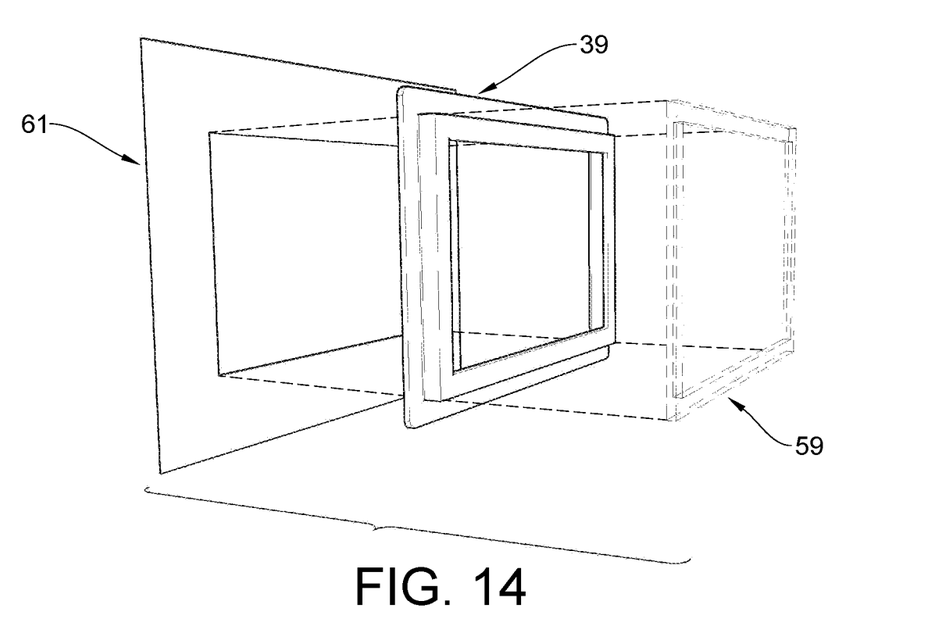
FIG. 14 is an alternative exploded perspective view of the finish material interface flange with paper tape in lieu of mesh and receiving an air sealing gasket.

Referring to FIGS. 13 and 14: The 2 "gang" embodiment of the Interface Flange (39) is shown in an exploded manner to depict the Interface Flange in relation to the placement of foam sealing tapes or gaskets (59, in dashed lines), shown here uncompressed.

Also referring to FIGS. 13 and 14: The Finish Material Interface Flange is shown also in an exploded manner with standard wallboard finishing paper tape (61) now used in lieu of meshes for wallboard finishing.

Means and methods of manufacture: the Finish Material Interface Flange may be manufactured using currently available precision plastic injection mold manufacturing methods as well as multi component injection molding (such as double shot molding and overmolding). They may be formed into the shapes shown in FIGS. 1-14 from typical thermoplastic materials including but not limited to polycarbonate, PVC, PPE blends or fiber reinforced polyester as non-limiting examples. Higher strength plastics including but not limited to PPS (polyphenylene) or polyamideimide (PAI) using single shot or other molding techniques may be used, again as non-limiting examples, to provide requisite rigidity, strength and durability. Regardless of the selected material, the general proportional and shape constraints between portions of the assembly apply.

The manufacturing materials used may provide and have the required National Electrical Manufacturers Association grades and may comply with the appropriate UL fire resistance classification where necessary.

For some installations requiring materials that substantially complement the placed electrical components such wallplates, receptacles and switches, the Finish Material Interface Flange may be made of nylon-based engineering grade polymer thermoplastics or thermoset plastics as non-limiting examples.

With respect to the manufacturing and assembly methods, the presented materials and methods of fabrication are exemplary in nature and therefore not necessary or critical. Other ways are also contemplated including but not limited to substituting materials of fabrication.

The detailed description and appended drawings describe and illustrate various exemplary embodiments of the invention. Each demonstrates non-limiting examples of construction and use while possessing characteristics of the invention. The description and drawings are not intended to limit the scope of the invention in any manner and the methods disclosed are representative of non-limiting applications.

What is claimed is:

1. A finish material interface flange comprising:
   a reveal back portion;
   a reveal side portion orthogonal to and integrally connected to the reveal back portion;
   a projection portion co-planar to and integrally connected to the reveal side portion;
   a finish material abutment portion orthogonal to and integrally connected to the reveal side portion; and an open face,
   the portions all formed as a unified structure, proportioned so as to permit said interface flange nested placement in a flush wallplate electrical box wallplate housing or a round flush wallplate electrical box wallplate housing and configured to interface between either of said flush wallplate electrical box housings and a wall, ceiling or floor assembly finish material and further proportioned to receive an electrical wallplate or a round electrical wallplate in a manner so as to dispose an electrical wallplate finished face or a round electrical wallplate finished face substantially co-planar to a wall, ceiling or floor assembly finish material finished surface.

2. The finish material interface flange of claim 1 wherein the finish material abutment portion receives a mesh or a tape element along its periphery.

\* \* \* \* \*